(12) United States Patent
Shen et al.

(10) Patent No.: US 10,927,792 B2
(45) Date of Patent: Feb. 23, 2021

(54) JET NOISE SUPPRESSOR

(71) Applicant: THE BOEING COMPANY, Chicago, IL (US)

(72) Inventors: Hao Shen, St. Peters, MO (US); Matthew T. Lakebrink, O'Fallon, MO (US); Timothy M. Garrett, St. Louis, CA (US)

(73) Assignee: THE BOEING COMPANY, Chicago, IL (US)

( * ) Notice: Subject to any disclaimer, the term of this patent is extended or adjusted under 35 U.S.C. 154(b) by 307 days.

(21) Appl. No.: 16/015,285

(22) Filed: Jun. 22, 2018

(65) Prior Publication Data
US 2019/0390632 A1   Dec. 26, 2019

(51) Int. Cl.
*F02K 1/46* (2006.01)
*B64D 27/20* (2006.01)
*F02K 1/52* (2006.01)

(52) U.S. Cl.
CPC ............... *F02K 1/46* (2013.01); *B64D 27/20* (2013.01); *F02K 1/52* (2013.01); *F05D 2220/323* (2013.01); *F05D 2240/128* (2013.01); *F05D 2250/711* (2013.01); *F05D 2250/712* (2013.01); *F05D 2260/96* (2013.01)

(58) Field of Classification Search
CPC ........... B64D 27/20; B64D 33/06; F02K 1/46; F02K 1/52; F02K 1/386; F02K 1/28; F02K 1/38; F02K 1/827; F02K 1/34; F02K 1/82; F05D 2220/323; F05D 2240/128; F05D 2250/711; F05D 2250/712; F05D 2260/96
See application file for complete search history.

(56) References Cited

U.S. PATENT DOCUMENTS

| | | | | |
|---|---|---|---|---|
| 3,002,341 A | * | 10/1961 | Muzzy | F02K 1/34 239/265.17 |
| 3,065,818 A | * | 11/1962 | Lombard | F02K 1/48 181/213 |
| 3,215,172 A | * | 11/1965 | Ardoin | F02K 1/36 181/220 |
| 3,572,466 A | * | 3/1971 | Hom | F02K 1/38 181/220 |
| 3,575,261 A | * | 4/1971 | Medawar | F02K 1/38 181/220 |

(Continued)

FOREIGN PATENT DOCUMENTS

EP     2730501 A2    5/2014

OTHER PUBLICATIONS

European Search Report for Application No. 19177494.2-1010 dated Oct. 16, 2019.

(Continued)

*Primary Examiner* — Medhat Badawi
(74) *Attorney, Agent, or Firm* — Patterson + Sheridan, LLP

(57) ABSTRACT

A jet noise suppressor and an airplane are provided. The jet noise suppressor includes a nozzle with a front end, a back end, an interior surface, and an exterior surface, a plurality of struts, and a plurality of vents. Each strut includes a base and a distal end with the base of each strut coupled to the interior surface of the nozzle, and each vent corresponds to a respective strut and is formed within the interior surface of the nozzle between the front end of the nozzle and the base of the respective strut.

20 Claims, 6 Drawing Sheets

(56) References Cited

U.S. PATENT DOCUMENTS

| | | | | |
|---|---|---|---|---|
| 3,650,348 | A * | 3/1972 | Colebrook | F02K 1/40 181/215 |
| 3,910,375 | A * | 10/1975 | Hache | F02K 1/383 181/215 |
| 4,117,671 | A * | 10/1978 | Neal | F02K 1/386 239/127.3 |
| 4,149,375 | A * | 4/1979 | Wynosky | F02K 1/386 60/262 |
| 4,196,585 | A * | 4/1980 | Svischev | F02K 1/36 239/127.3 |
| 4,298,089 | A * | 11/1981 | Birch | F02K 1/386 181/213 |
| 4,335,801 | A * | 6/1982 | Stachowiak | F02K 1/48 181/213 |
| 4,474,259 | A * | 10/1984 | Wright | F02K 1/46 181/213 |
| 4,567,960 | A * | 2/1986 | Johnson | F02K 1/38 181/220 |
| 4,720,901 | A * | 1/1988 | Johnson | F02K 1/38 29/428 |
| 4,909,346 | A * | 3/1990 | Torkelson | F02K 1/08 181/213 |
| 5,060,471 | A * | 10/1991 | Torkelson | F02K 1/827 181/213 |
| 5,092,425 | A * | 3/1992 | Shaw, Jr. | F02K 1/34 181/213 |
| 5,440,875 | A * | 8/1995 | Torkelson | F02K 1/36 239/265.17 |
| 5,444,912 | A * | 8/1995 | Folmer | B23P 15/00 29/469.5 |
| 5,947,412 | A * | 9/1999 | Berman | B64C 7/02 239/265.17 |
| 7,805,925 | B2 * | 10/2010 | Durocher | F02K 1/04 239/265.25 |
| 9,476,385 | B2 * | 10/2016 | Moore | F02K 1/44 |
| 9,745,919 | B2 * | 8/2017 | Di Paola | F02K 1/386 |
| 9,758,254 | B2 | 9/2017 | Moore et al. | |
| 10,197,009 | B2 * | 2/2019 | Yan | F02K 1/386 |
| 10,273,016 | B2 * | 4/2019 | de Vulpillieres | F02K 1/60 |
| 2007/0000234 | A1 * | 1/2007 | Anderson | F02K 1/46 60/262 |
| 2016/0130011 | A1 * | 5/2016 | Moore | F02K 1/46 239/8 |

OTHER PUBLICATIONS

Seiner, John M. et al., "Noise Reduction Technology for F/A-18 E/F Aircraft", American Institute of Aeronautics and Astronautics, 2004, pp. 1-13.
European Examination Report for Application No. 19 177 494.2-1010 dated Nov. 11, 2019.
European Patent Office Examination Report for Application No. 19 177 494.2-1010 dated Dec. 11, 2020.

* cited by examiner

JET NOISE SUPPRESSOR

TECHNICAL FIELD

Embodiments of the present disclosure relate to a suppressor, and more particularly to a suppressor for a jet engine, such as used with an aircraft.

BACKGROUND

Aircraft, including commercial aircraft and military aircraft, play a vital role in modern society. Commercial aircraft are used to transport people and goods, thereby facilitating commerce. Military aircraft serve various roles, including personnel transportation and ordinance delivery, thereby ensure a strong and effective national defense. However, the noise generated by aircraft engines can be a nuisance that leads to complaints and is controlled by various ordinances or laws.

The noise generated by aircraft engines varies from aircraft-to-aircraft. Typically, the noise intensity level is a function of the velocity of the jet plume emitted by the aircraft engine. For example, supersonic aircraft using small bypass ratio turbo-fan engines produce jet plumes with much higher velocity compared to subsonic aircrafts using high bypass ratio engines. Therefore, supersonic aircrafts tend to generate more jet noise in low altitude operations and be more of a nuisance, and prompt more community complaints, than typical commercial aircraft.

Furthermore, the activity of the aircraft may also be an aircraft noise consideration. For example, Field Carrier Landing Practices performed by the United States Navy involve a series of touch-and-goes using a relatively short runway, thereby simulating landing and take-off from the deck of an aircraft carrier. The flight patterns and airspeeds required during Field Carrier Landing Practice tend to produce noise more intense than other types of activity with the aircraft over land. Therefore, Field Carrier Landing Practices were traditionally performed at outlying airfields. However, despite these considerations, over time the general public has moved closer in proximity to the outlying airfields with increased exposure to the Field Carrier Landing Practices and the noise generated therefrom.

Accordingly, it may be desired to focus on further developments in the field of jet noise suppression while limiting the adverse effect of the jet noise suppression on the jet engine when in use.

SUMMARY

The systems, methods, apparatuses, and devices of the present disclosure each have several embodiments, no single one of which is solely responsible for its desirable attributes. Without limiting the scope of the present disclosure as expressed by the claims which follow, some features will now be discussed briefly. After considering this discussion, and particularly after reading the section entitled "Detailed Description" one will understand how the features of this disclosure provide advantages that include suppression of j et noise.

In one embodiment, a jet noise suppressor is disclosed. The jet noise suppressor includes a nozzle with a front end, a back end, an interior surface, and an exterior surface and a plurality of struts, each strut including a base and a distal end, with the base of each strut coupled to the interior surface of the nozzle. The jet noise suppressor further includes a plurality of vents with each vent corresponding to a respective strut. Each vent is formed within the interior surface of the nozzle between the front end of the nozzle and the base of the respective strut.

In another embodiment, a jet noise suppressor is disclosed. The jet noise suppressor includes a nozzle with a front end, a back end, an interior surface, and an exterior surface and a plurality of struts, each strut including a base and a distal end, with the base of each strut coupled to the interior surface of the nozzle and the distal end of each strut freestanding such that each strut is only coupled to the nozzle, directly or indirectly, at the base of each strut with the interior surface of the nozzle. The jet noise suppressor further includes a plurality of vents with each vent corresponding to a respective strut and extending through the respective strut.

In another embodiment, an aircraft is disclosed. The aircraft includes a jet engine with a back end that generates an exhaust flow passage to propel the aircraft. The aircraft further includes a jet noise suppressor. The jet noise suppressor includes a nozzle with a front end, a back end, an interior surface, and an exterior surface and a plurality of struts, each strut including a base and a distal end, with the base of each strut coupled to the interior surface of the nozzle. The jet noise suppressor further includes a plurality of vents with each vent corresponding to a respective strut. Each vent is formed within the interior surface of the nozzle between the front end of the nozzle and the base of the respective strut. The aircraft further includes a coupling member to removably couple the nozzle to the jet engine or a fuselage of the aircraft.

Embodiments generally include methods, apparatus, and systems, as substantially described herein with reference to and as illustrated by the accompanying drawings. Numerous other aspects are provided.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF ILLUSTRATIONS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements described in one aspect may be beneficially utilized on other aspects without specific recitation.

DETAILED DESCRIPTION

Figure 1:
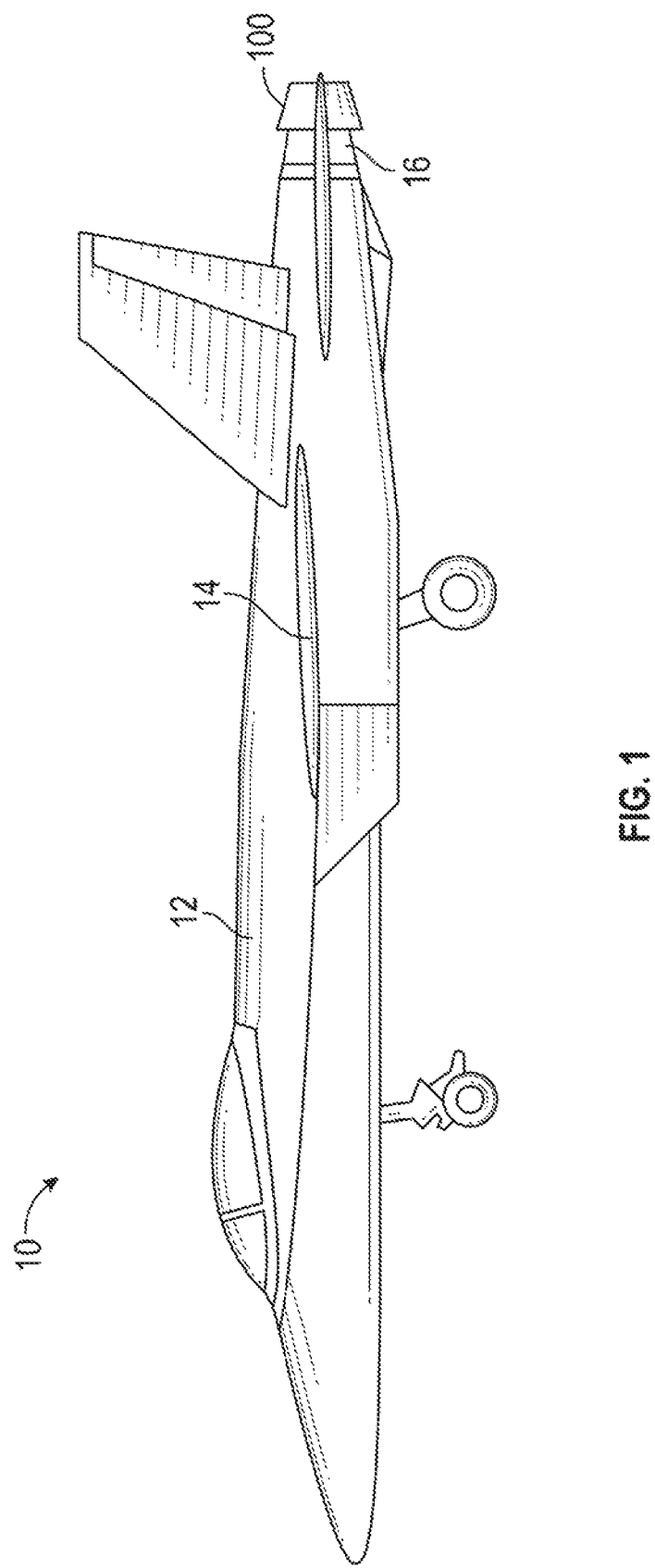
FIG. 1 is a side view of an aircraft including a jet noise suppressor in accordance with one or more embodiments of the present disclosure.

In the following, reference is made to embodiments presented in the present disclosure. However, the scope of the present disclosure is not limited to specific described embodiments. Instead, any combination of the following features and elements, whether related to different aspects or not, is contemplated to implement and practice contemplated aspects. Furthermore, although embodiments disclosed herein may achieve advantages over other possible solutions or over the prior art, whether or not a particular advantage is achieved by a given aspect is not limiting of the scope of the present disclosure. Thus, the following embodiments, features, and advantages are merely illustrative and are not considered elements or limitations of the appended claims except where explicitly recited in a claim(s). Likewise, reference to "the invention" or "the disclosure" shall not be construed as a generalization of any inventive subject matter disclosed herein and shall not be considered to be an element or limitation of the appended claims except where explicitly recited in a claim(s).

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in FIG. X may be labeled "Xa" and a similar feature in FIG. Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

A jet noise suppressor in accordance with one or more embodiments of the present disclosure may be used to suppress noise from a jet engine. Further, the jet noise suppressor may be able to limit a negative effect on the jet engine, such as limit or minimize a thrust penalty to the jet engine when in use with the jet engine. The jet noise suppressor includes a nozzle, which may be aligned coaxially with the jet engine. For example, the nozzle and the jet engine may each include or be defined about an axis, in which the axis of the nozzle is coaxially aligned with the axis of the jet engine when the jet noise suppressor is in use with the jet engine.

The nozzle includes a front end, a back end, an interior surface, and an exterior surface. One or more struts are coupled to the interior surface of the nozzle and extend radially inward into the nozzle. In particular, the struts include a base and a distal end, in which the base of the struts are coupled to the interior surface of the nozzle. The distal end of the struts may be freestanding, in that the struts are only coupled to a structure or component through the base of the struts.

The jet noise suppressor further includes one or more vents formed therethrough. In particular, a vent corresponds to each strut, in that a vent is included with each respective strut within the jet noise suppressor. Each vent may be formed within the interior surface between the front end of the nozzle and the base of the respective strut, and the vent may extend through the respective strut from the base of the respective strut to the distal end of the respective strut. For example, each vent includes an inlet and an outlet. The inlet of each vent may be formed within the interior surface of the nozzle between the front end of the nozzle and the base of the respective strut, and the outlet of each vent may be formed within the distal end of the respective strut.

The inlet of each vent may be formed adjacent or within the front end of the nozzle. Further, the distal end of each strut may be freestanding such that each strut is only coupled to the nozzle, directly or indirectly, at the base of each strut with the interior surface of the nozzle. In such an embodiment, the distal end of each strut may not rely, be supported by, or be coupled to any structure.

Figure 2:
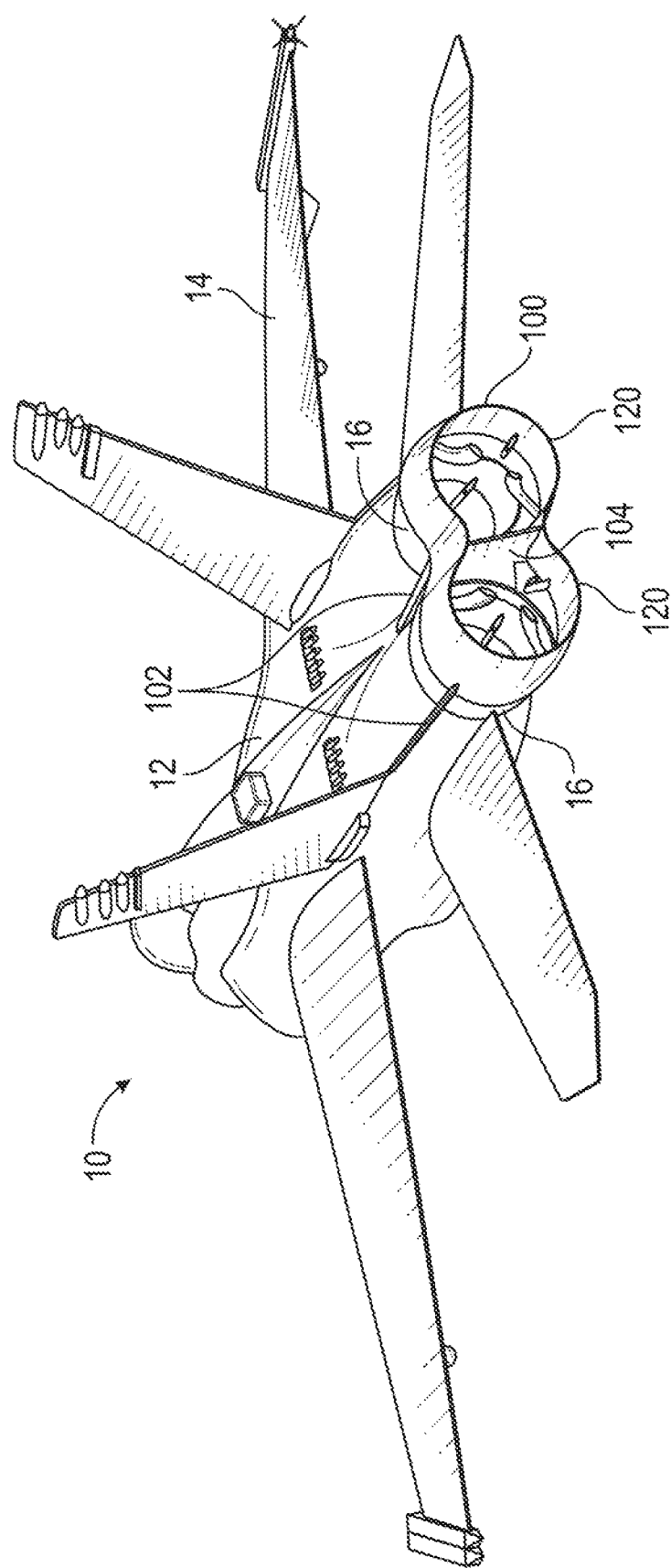
FIG. 2 is a back perspective view of an aircraft including a jet noise suppressor in accordance with one or more embodiments of the present disclosure.

Referring now to FIGS. 1 and 2, multiple views of an aircraft 10 including a jet noise suppressor 100 in accordance with one or more embodiments of the present disclosure are shown. In particular, FIG. 1 is a side view of the aircraft 10 including the jet noise suppressor 100, and FIG. 2 is a back perspective view of the aircraft 10 including the jet noise suppressor 100. While the aircraft 10 is shown as a military jet aircraft in FIGS. 1 and 2, the present disclosure is not so limited, and may be used with other aircraft or even other vehicles without departing from the scope of the present disclosure. For example, the jet noise suppressor 100 may be used with a commercial passenger jet aircraft, a freighter jet aircraft, a corporate jet aircraft, and/or a private jet aircraft. Further, the jet noise suppressor 100 may be used with other jet powered vehicles and/or mobile platforms besides an aircraft, such as a jet powered rotorcraft. Thus, a jet noise suppressor in accordance with the present disclosure may be used with any vehicle or platform that includes a jet engine to suppress noise from the jet engine.

The aircraft 10 includes a fuselage 12 with wings 14 coupled to the fuselage 12 on opposing sides of the fuselage 12. Further, one or more jet engines 16 are included with the aircraft 10 to generate an exhaust flow from the jet engines 16 for propelling the aircraft 10. In this embodiment, though two jet engines 16 are shown with the aircraft 10, the present disclosure is not so limited, as the aircraft 10, or any vehicle or platform using the jet noise suppressor 100, may include only one jet engine 16 or more than two jet engines 16.

The jet engines 16, which may include turbofan engines in this embodiment, are included with or coupled to the fuselage 12. For example, in this embodiment, the jet engines 16 are housed within a nacelle coupled to the fuselage 12 at a rear or back end of the fuselage 12. However, in one or more other embodiments, the jet engines 16 may be coupled to other areas of the fuselage 12 or the aircraft 10 in general. For example, one or more jet engines 16 may be coupled under or over the wings 14.

The jet noise suppressor 100 is coupled to the aircraft 10 and positioned behind a back end of the jet engines 16 to suppress noise generated by the jet engines 16. For example, the jet noise suppressor 100 may be coupled (e.g., mechanically secured) to the fuselage 12, may be coupled to the jet engine 16 (e.g., to the nacelle containing the jet engine), and/or may be coupled to an engine support structure (e.g., a bulkhead, an engine pylon, a support strut, etc.).

Figure 3:
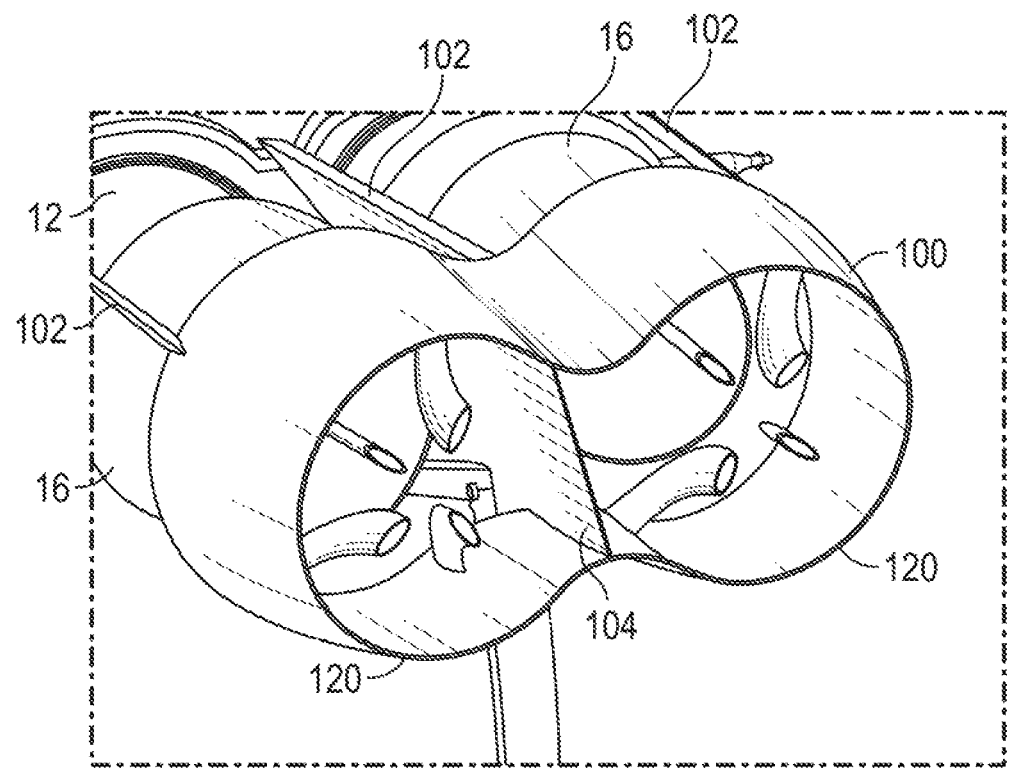
FIG. 3 is an enlarged back perspective view of an aircraft including a jet noise suppressor in accordance with one or more embodiments of the present disclosure.
Figure 4:
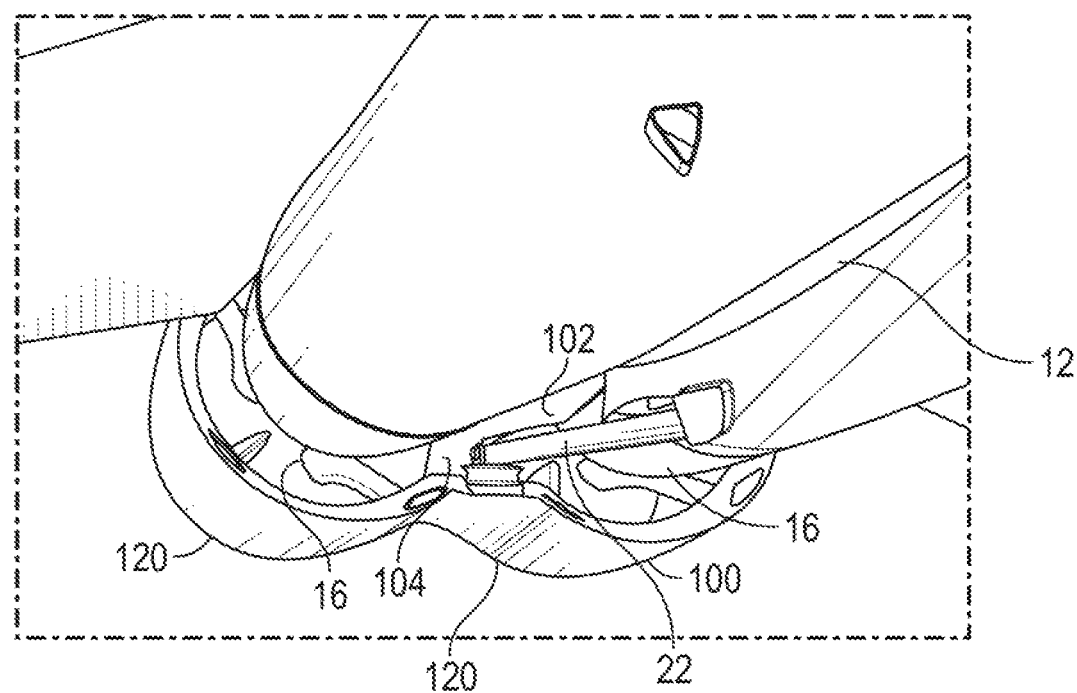
FIG. 4 is an underneath perspective view of an aircraft including a jet noise suppressor in accordance with one or more embodiments of the present disclosure.

Referring now to FIGS. 3-4, multiple views of one or more coupling members 102 to couple the jet noise suppressor 100 to the aircraft 10 in accordance with one or more embodiments of the present disclosure are shown. FIG. 3 is an enlarged back perspective view of the aircraft 10 including the jet noise suppressor 100 shown in FIG. 2, and FIG. 4 is an underneath perspective view of the aircraft 10 including the jet noise suppressor 100. The jet noise suppressor 100 may be coupled to the aircraft 10 through one or more coupling members 102 and positioned the jet noise suppressor 100 relative to a back end of the jet engine 16. For example, the jet noise suppressor 100 may be positioned relative to the back end 18 of the jet engine 16 such that the jet noise suppressor 100, or the nozzle 120, is aligned coaxially with the jet engine 16.

As such, the coupling members 102 may be used to couple the jet noise suppressor 100 to the aircraft 10 and position the jet noise suppressor 100 relative to the back end 18 of the jet engine 16. The coupling members 102, as shown, may be coupled to a portion of the fuselage 12 positioned between or interconnecting the jet engines 16. In one or more other embodiments, the coupling members 102 may be coupled to other areas or portions of the fuselage 12, and/or may be coupled to the jet engines 16. The coupling members 102 may be formed integrally with the jet noise suppressor 100, and/or the coupling members 102 may be formed separately from and then coupled to the jet noise suppressor 100. Further, the jet noise suppressor 100 may be used to receive a tailhook 22. For example, the tailhook 22, which may be include underneath the aircraft 10 to facilitate rapid deceleration of the aircraft 10, may be retracted with an end of the tailhook 22 received in the jet noise suppressor 100 for purposes of storage.

One having ordinary skill in the art, with the benefit of the present disclosure, will appreciate that the present disclosure is not limited to only the structure and configuration for the coupling members 102 shown and discussed above and that the present disclosure contemplates other arrangements. For example, the configuration of the coupling members 102 shown in FIGS. 3 and 4 is for the aircraft 10 including a rear mounted twin-engine aircraft. Thus, for other types of jet engine configurations, such as on aircraft including only single engines or non-rear mounted engines, or non-aircraft including jet engines, other types of structures and configurations. Thus, the particular configuration and/or shape of the coupling members 102 may depend on the type and/or configuration of the aircraft 10, the location of the jet engines 16 on the aircraft 10, and/or one or more other factors. Further, the coupling members 102 may have an aerodynamic outer surface to reduce drag.

In one or more embodiments, the jet noise suppressor 100 may be removably coupled to the aircraft 10. For example, the coupling members 102 may be used to removably couple the jet noise suppressor 100 to the aircraft 10, such as by having the coupling members 102 removably coupled to the aircraft 10 and/or the jet noise suppressor 100. Having the jet noise suppressor 100 removably coupled to the aircraft 10 may provide for utilization of the jet noise suppressor 100 to reduce jet noise during particular maneuvers, such as during Field Carrier Landing Practice missions, without the need to permanently retrofit the aircraft 10 for all maneuvers or missions. The jet noise suppressor 100 may also be removable from the aircraft 10 such that the jet noise suppressor 100 may be used with other aircraft or other jet engines.

In one embodiment, a coupling member 102 may be coupled to the aircraft 10 through one or more fasteners (e.g., bolts), through a press-fit engagement, and/or through a male-female component engagement. The coupling member 102 may be manually installed and/or removed to couple and decouple the jet noise suppressor 100 to the aircraft 10. In another embodiment, frangible components, or frangible fasteners, may be used to couple the coupling member 102 to the aircraft 10, in which the jet noise suppressor 100 may be decoupled from the aircraft 10 by breaking the frangible component, such as even during flight of the aircraft 10. However, the jet noise suppressor 100 may also be permanently coupled to the aircraft 10, such as by having the coupling members 102 permanently coupled (e.g., welded, or integrally formed) to the aircraft 10 and/or the jet noise suppressor 100.

Further, the jet noise suppressor 100 includes one or more nozzles 120. For example, though only one nozzle 120 may be included within the jet noise suppressor 100, multiple nozzles 120 are included within the jet noise suppressor 100 shown in FIGS. 2-4. The jet noise suppressor 100 includes multiple nozzles 120, and in particular two nozzles 120, such that a nozzle 120 is associated with a respective jet engine 16 to suppress noise from the associated respective jet engine 16. In an embodiment in which multiple nozzles 120 are included with the jet noise suppressor 100, each nozzle 120 may be coaxially aligned with the respective jet engine 16. In such an embodiment, a divider 104 may be included within the jet noise suppressor 100 and positioned between the nozzles 120. The divider 104 may be used to contain airflow within each respective nozzle 120 and prevent cross airflow between the nozzles 120 or from the jet engines 16. Further, in one or more embodiments, the divider 104 may be used to facilitate coupling of the jet noise suppressor 100 to the aircraft 10, such as along with the coupling member 102.

Figure 5:
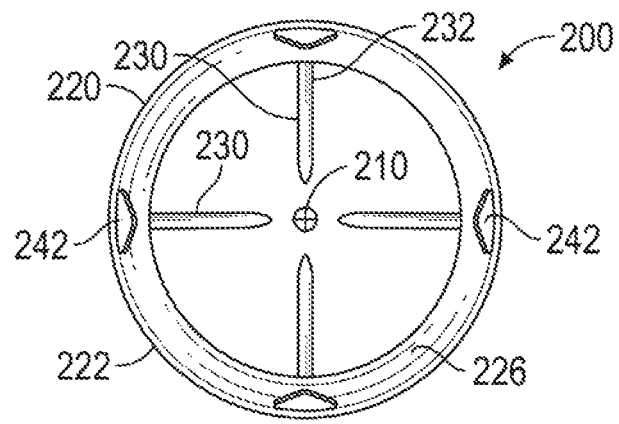
FIG. 5 shows a front view of a jet noise suppressor in accordance with one or more embodiments of the present disclosure.
Figure 6:
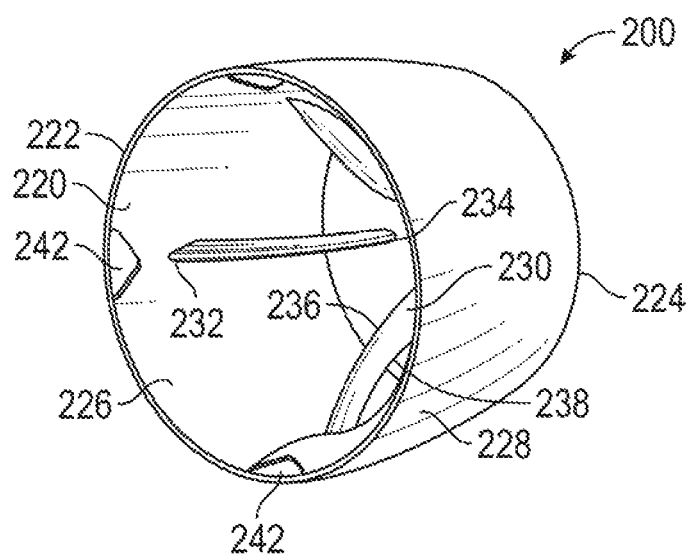
FIG. 6 shows a front perspective view of a jet noise suppressor in accordance with one or more embodiments of the present disclosure.
Figure 7:
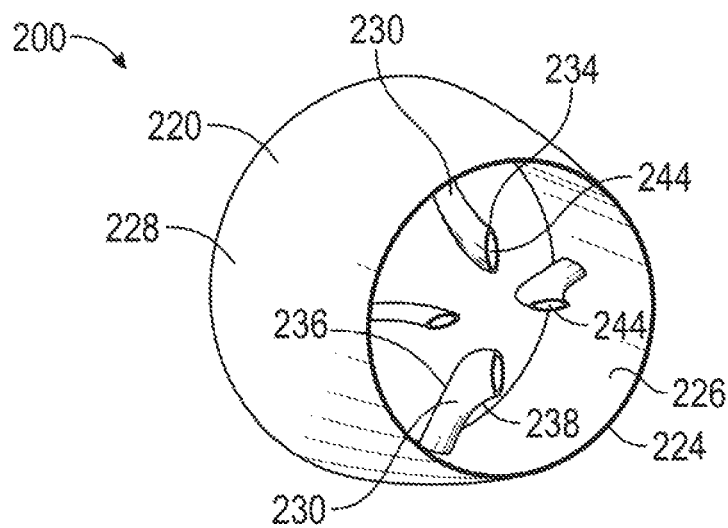
FIG. 7 shows a back perspective view of a jet noise suppressor in accordance with one or more embodiments of the present disclosure.
Figure 8:
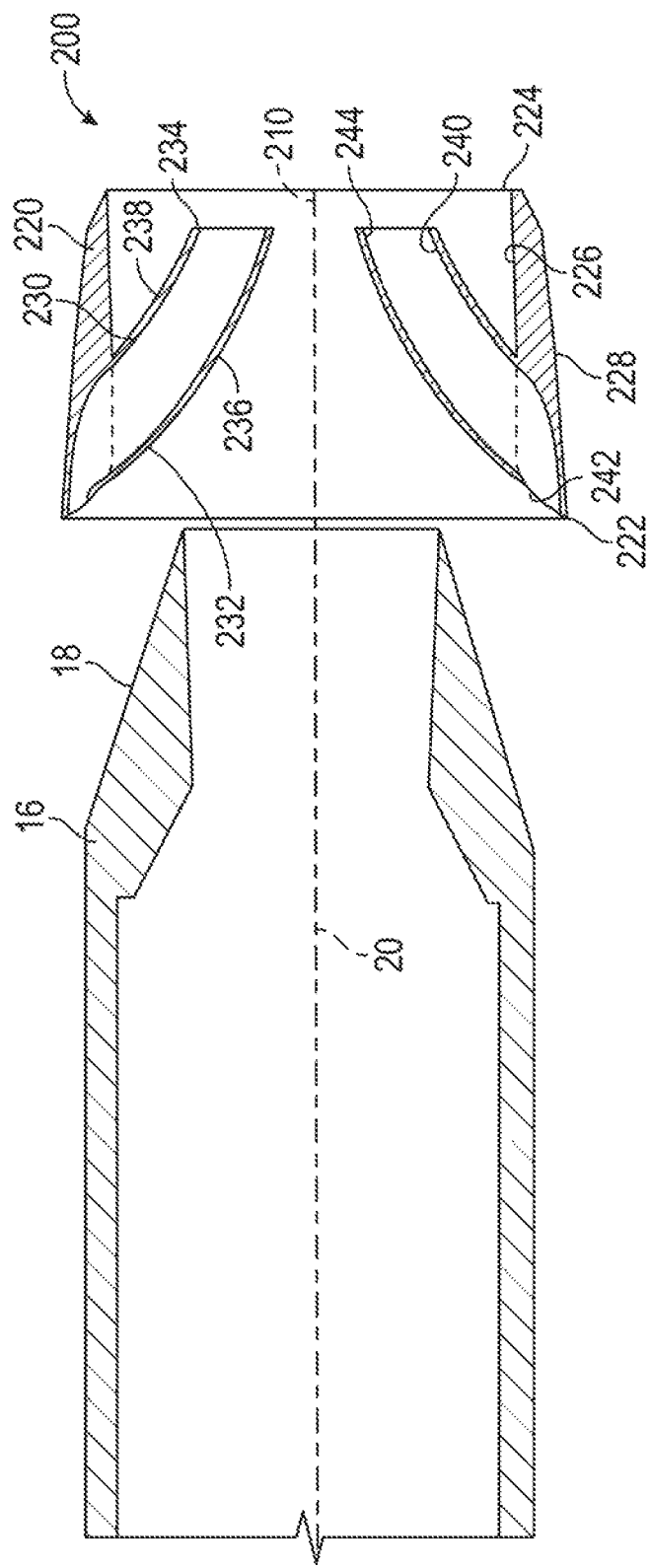
FIG. 8 shows a cross-sectional view of a jet noise suppressor with a jet engine in accordance with one or more embodiments of the present disclosure.

Referring now to FIGS. 5-8, multiple views of a jet noise suppressor 200 in accordance with one or more embodiments of the present disclosure are shown. In particular, FIG. 5 shows a front view of the jet noise suppressor 200, FIG. 6 shows a front perspective view of the jet noise suppressor 200, FIG. 7 shows a back perspective view of the jet noise suppressor 200, and FIG. 8 shows a cross-sectional view of the jet noise suppressor 200 coupled with the jet engine 16.

The jet noise suppressor 200 shown in this embodiment includes one nozzle 220, though the present disclosure is not so limited, in which the jet noise suppressor 200 may include more than one nozzle in other embodiments. The nozzle 220 includes an axis 210 formed therethrough and a front end 222, a back end 224, an interior surface 226, and an exterior surface 228. As best shown in FIG. 8, when the jet noise suppressor 200 is coupled with the jet engine 16, the jet noise suppressor 200 is positioned such that the front end 222 of the nozzle 220 is closer to a back end 18 of the jet engine 16 than the back end 224 of the nozzle 220 for orientation. Thus, the jet engine 16 generates an exhaust flow from the back end 18 that is received in the front end 222 of the nozzle 220. As shown, the interior surface 226 of the nozzle 220 may include a concave shape or a straight shape, and the exterior surface 228 of the nozzle 220 may include a convex shape or a straight shape.

The jet noise suppressor 200 further includes one or more struts 230. Each strut 230 is coupled to the nozzle 220. In particular, the struts 230 each include a base 232 and a distal end 234. The base 232 of the struts 230 are coupled to the interior surface 226 of the nozzle 220 and extend radially inward within or with respect to the nozzle 220. The base 232 of the struts 230 are, thus, positioned on the interior surface 226 upstream of the distal end 234 of the struts 230 within the nozzle 220, such as with the base 232 of the struts 230 positioned closer to the front end 222 of the nozzle 220 than the distal end 234 of the struts 230.

Further, the distal end 234 of one or more of the struts 230 may be freestanding. In particular, the distal end 234 of the struts 230 may be freestanding such that the struts 230 are only coupled to the nozzle 220 or any other structure or component (e.g., including other struts 230), directly or indirectly, at the base 232 of the struts 230 with the interior surface 226 of the nozzle 220. The distal end 234 of the struts 230, thus, may not rely on any additional support, such as by being coupled to each other or by being coupled to another structure (e.g., the nozzle 220). For example, no additional body or structure is positioned within the nozzle 220 with distal end 234 of the struts 230 coupled to the body.

The freestanding distal end 234 of the struts 230 may facilitate airflow through the nozzle 220 and prevent drag through the jet noise suppressor 200. However, in one or more embodiments, the distal end 234 of one or more of the struts 230 may not be freestanding, in that one or more support members may be used to support the distal end 234 of the struts 230. In such an embodiment, the support members may be coupled between each of the distal end 234 of the struts 230, or the support members may be coupled between the distal end 234 of the struts 230 and the interior surface 226 of the nozzle 220.

The struts 230 may also include a swept shape, such as to facilitate airflow through the nozzle 220 and reduce force on the struts 230. For example, the struts 230 may include a leading surface 236, or a leading edge, and a trailing surface 238, or a trailing edge. The leading surface 236 of the struts 230 are positioned upstream of the trailing surface 238 of the struts 230 within the nozzle 220, such as with the leading surface 236 of the struts 230 positioned closer to the front end 222 of the nozzle 220 than the trailing surface 238 of the struts 230. The leading surface 236 of the struts 230 may include a convex shape. In particular, the leading surface 236 may include a completely convex shape, or may include a straight shape, but does not include a concave shape. Further, the trailing surface 238 of the struts 230 may include a concave shape. In particular, the trailing surface 238 may include a completely concave shape, or may include a straight shape, but does not include a convex shape. The swept shape and contour of the struts 230 may facilitate having the distal end 234 of the struts 230 as freestanding by reducing force applied to the struts 230 from the airflow through the jet noise suppressor 200.

Referring still to FIGS. 5-8, the jet noise suppressor 200 further includes one or more vents 240. For example, a vent 240 may be formed within the jet noise suppressor 200 with each vent 240 corresponding to or included within a respective strut 230. Thus, a vent 240 may be included or formed within each strut 230. The vents 240 are formed within the interior surface 226 of the nozzle 220 of the jet noise suppressor 200, and more particularly formed between the front end 222 of the nozzle 220 and the base 232 of the struts 230. The vents 240 further extend axially through the nozzle 220 and radially towards the axis 210 of the nozzle 220 to enter the base 232 of the struts 230.

The vents 240, as shown, each include an inlet 242 and an outlet 244. The inlet 242 of the vents 240 are formed within the interior surface 226 of the nozzle 220. For example, the inlet 242 of the vents 240 are positioned upstream of the struts 230, such as between the front end 222 of the nozzle 220 and the base 232 of the struts 230. In one or more embodiments, the inlet 242 of the vents 240 may also be formed adjacent to or within the front end 222 of the nozzle 220. The vents 240 then extend into the nozzle 220 from the interior surface 226, such as by extending axially through the nozzle 220, and enter the struts 230 by extending radially into the base 232 of the struts 230. Further, the vents 240, as shown, extend from the base 232 of the struts 230 to the distal end 234 of the struts 230. In the embodiment shown, the outlets 244 of the vents 240 are formed within the distal ends 234 of the struts 230. However, in one or more other embodiments, the outlet 244 of the vents 240 may be formed in other surfaces of the struts 230, such as formed within the leading surface 236 or the trailing surface 238 of the struts 230, without departing from the scope of the present disclosure.

The struts 230, and therefore the vents 240, may be equally spaced from each other within the nozzle 220. In particular, the struts 230 may be equally spaced apart from each other about the axis 210 of the nozzle 220. As shown in FIGS. 5-7, the jet noise suppressor 200 may include four struts 230. Thus, the struts 230 may be positioned about 90 degrees apart from each other with respect to the axis 210 of the nozzle 220. However, the present disclosure is not so limited, as the jet noise suppressor 200 may include more or less than four struts 230, and the struts 230 may or may not be equally spaced from each other.

In one or more embodiments, the struts 230 may be coupled to the nozzle 220 through one or more fasteners (e.g., bolts), through a press-fit engagement, and/or through a male-female component engagement. For example, fasteners may be used to couple the base 232 of the struts 230 to the interior surface 226 of the nozzle 220. However, in other embodiments, the struts 230 may be integrally formed with the nozzle 220 and/or permanently coupled to the nozzle 220, such as by having the struts 230 welded to the nozzle 220. Further, jet noise suppressor 200 may be formed from the same or similar material or have the same or similar construction as the airplane 10 or the jet engine 12. For example, the jet noise suppressor 200, and more particularly the nozzle 220 and the struts 230, may include or be formed from metal, such as aluminum, steel, titanium, or other metals or alloys, or may include or be formed from other materials, such as composite materials including graphite and/or epoxy.

Referring now specifically to FIG. 8, the jet noise suppressor 200 is shown coupled with and positioned relative to the jet engine 16. The jet engine 16 includes a back end 18 with the jet engine 16 defined about an axis 20. Further, the nozzle 220 of the jet noise suppressor 200 is defined about an axis 210. As mentioned above, the jet noise suppressor 200 may be positioned relative to the back end 18 of the jet engine 16 such that the nozzle 220 is aligned coaxially with the jet engine 16. Thus, as shown in FIG. 8, the axis 210 of the nozzle 220 is coaxially aligned with the axis 20 of the jet engine 16 when the jet noise suppressor 200 is in use with the jet engine 16.

Figure 9:
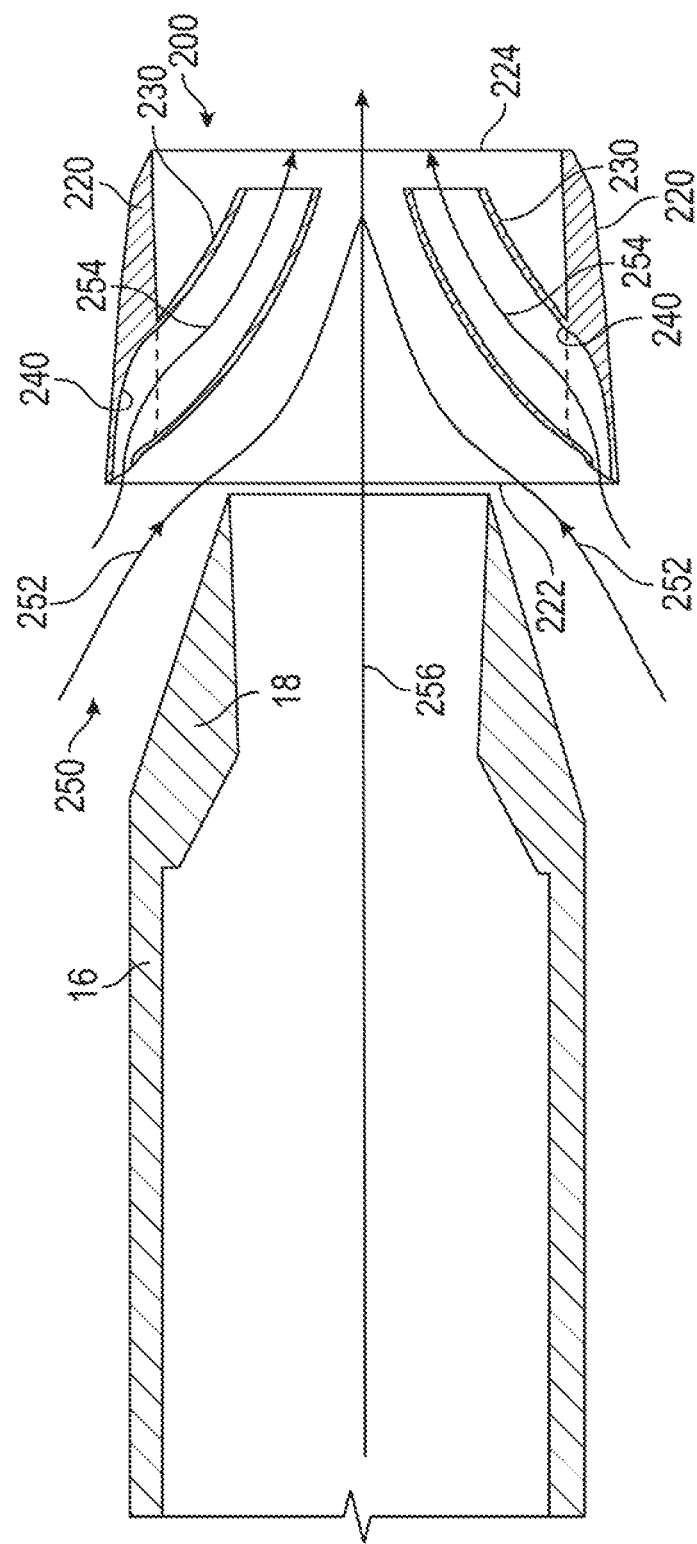
FIG. 9 shows a cross-sectional view of a jet noise suppressor in use with a jet engine in accordance with one or more embodiments of the present disclosure.

Referring now to FIG. 9, a cross-sectional view of the jet noise suppressor 200 in use with the jet engine 16 in accordance with one or more embodiments of the present disclosure is shown. The jet noise suppressor 200, when coupled to the jet engine 16, defines an open area 250 between the front end 222 of the nozzle 220 and the jet engine 16. When the jet noise suppressor 200 is in use with the jet engine 16, a first airflow passage 252 is received through the open area 250 to pass through the nozzle 220 and exit the back end 224 of the nozzle 220. Further, the vents 240 define a second airflow passage 254 for the jet noise suppressor 200. When in use, the second airflow passage 254 enters the inlet 242 of the vents 240 and exits the outlet 244 of the vents 240. The second airflow passage 254 may also mix with the first airflow passage 252 when exiting the back end 224 of the nozzle 220. The jet noise suppressor 200 also receives an exhaust flow passage 256 from the back end 18 of the jet engine 16. The exhaust flow passage 256 is received in the front end 222 of the nozzle 220, mixes with the first airflow passage 252 and/or the second airflow passage 254, and then exits the back end 224 of the nozzle 220.

The jet noise suppressor 200 is able to define and mix multiple airflows when suppressing noise from the jet engine 16. In particular, the jet noise suppressor 200 is able to mix ambient air through the first airflow passage 252 and/or the second airflow passage 254 with the exhaust flow passage 256 from the jet engine 16 to suppress noise. The jet noise suppressor 200, thus, may be able to reduce or suppress noise from the jet engine 16 by about 6 decibels. Further, the jet noise suppressor 200 may be able to minimize a thrust penalty associated with the jet noise suppressor 200 by minimizing structure included within the nozzle 220, and more particularly components positioned centrally within the nozzle 220. For example, the jet noise suppressor 200 may only have a thrust penalty of about 2.3%, which is compared to the thrust capability of the jet engine 16 without the jet noise suppressor 200.

A jet noise suppressor in accordance with the present disclosure may be able to reduce or suppress noise from a jet engine, such as noise generated by aircrafts. This may be particularly helpful for training operations of military aircrafts occurring near residential areas to reduce the noise associated with the training operations. Further, the jet noise suppressor may be installable and removable from the aircraft as needed, and thus the jet noise suppressor need not be permanently fitted to an aircraft to suppress noise. Furthermore, a jet noise suppressor in accordance with the present disclosure may be used with various jet engines on various vehicles.

While the present disclosure has been described in detail in connection with only a limited number of embodiments, it should be readily understood that the present disclosure is not limited to such described embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof.

Therefore, it is intended that the present disclosure not be limited to the particular embodiment described as the best mode contemplated for carrying out this present disclosure, but that the present disclosure will include all embodiments falling within the scope of the claims.

What is claimed is:

1. A jet noise suppressor, comprising:
   a nozzle comprising a front end, a back end, an interior surface, and an exterior surface;
   a plurality of struts, each strut comprising a base and a distal end, with the base of each strut coupled to the interior surface of the nozzle; and
   a plurality of vents, each vent corresponding to a respective strut and formed within the interior surface of the nozzle between the front end of the nozzle and the base of the respective strut, wherein each vent comprises an inlet formed in the front end of the nozzle within the interior surface of the nozzle.

2. The jet noise suppressor of claim 1, wherein each vent extends through the respective strut from the base of the respective strut to the distal end of the respective strut.

3. The jet noise suppressor of claim 2, wherein:
   each vent comprises an outlet; and
   the outlet of each vent is formed within the distal end of the respective strut.

4. The jet noise suppressor of claim 3, wherein the nozzle is configured to receive a tailhook of an aircraft.

5. The jet noise suppressor of claim 1, wherein the distal end of each strut is freestanding such that each strut is only coupled to the nozzle, directly or indirectly, at the base of each strut with the interior surface of the nozzle.

6. The jet noise suppressor of claim 5, wherein each strut comprises a swept shape.

7. The jet noise suppressor of claim 6, wherein:
   a leading surface of each strut comprises a convex shape; and
   a trailing surface of each strut comprises a concave shape.

8. The jet noise suppressor of claim 1, wherein:
   the interior surface of the nozzle comprises a concave shape; and
   the exterior surface of the nozzle comprises a convex shape.

9. The jet noise suppressor of claim 1, further comprising a coupling member to removably couple the nozzle to a jet engine or a fuselage of an aircraft.

10. The jet noise suppressor of claim 1, wherein the nozzle comprises a first nozzle, the jet noise suppressor further comprising a second nozzle with the first nozzle, and each of the first nozzle and the second nozzle are configured to be coaxially aligned with a respective jet engine of a pair of jet engines of an aircraft.

11. The jet noise suppressor of claim 1, wherein, when the nozzle is aligned coaxially with a jet engine:
- an open area between the front end of the nozzle and the jet engine is configured to receive a first airflow passage through the nozzle that exits the back end of the nozzle; and
- the plurality of vents are configured to receive a second airflow passage that mixes with the first airflow passage and exits the back end of the nozzle.

12. The jet noise suppressor of claim 1, wherein the plurality of struts are equally spaced apart from each other about an axis of the nozzle.

13. A jet noise suppressor, comprising:
- a nozzle comprising a front end, a back end, an interior surface, and an exterior surface;
- a plurality of struts, each strut comprising a base and a distal end, with the base of each strut coupled to the interior surface of the nozzle and the distal end of each strut freestanding such that each strut is only coupled to the nozzle, directly or indirectly, at the base of each strut with the interior surface of the nozzle; and
- a plurality of vents each having an inlet formed within the interior surface of the nozzle, each vent corresponding to a respective strut and extending through the respective strut.

14. The jet noise suppressor of claim 13, wherein each inlet is formed at the front end of the nozzle.

15. The jet noise suppressor of claim 14, wherein each vent extends through the respective strut from the base to the distal end of the respective strut.

16. The jet noise suppressor of claim 13, wherein:
- a leading surface of each strut comprises a convex shape; and
- a trailing surface of each strut comprises a concave shape.

17. An aircraft, comprising:
- a jet engine comprising a back end configured to generate an exhaust flow passage to propel the aircraft;
- a jet noise suppressor, comprising:
- a nozzle comprising a front end, a back end, an interior surface, and an exterior surface;
- a plurality of struts, each strut comprising a base and a distal end, with the base of each strut coupled to the interior surface of the nozzle; and
- a plurality of vents, each vent having an inlet formed within the interior surface of the nozzle at the front end of the nozzle and corresponding to a respective strut and formed within the interior surface of the nozzle between the front end of the nozzle and the base of the respective strut; and
- a coupling member to removably couple the nozzle to the jet engine or a fuselage of the aircraft.

18. The aircraft of claim 17, wherein the distal end of each strut is freestanding.

19. The aircraft of claim 17, wherein the jet engine comprises a first jet engine and the nozzle comprises a first nozzle, the aircraft further comprising a second jet engine and the jet noise suppressor further comprising a second nozzle coupled to the first nozzle, the first nozzle coaxially aligned with the first jet engine and the second nozzle coaxially aligned with the second jet engine.

20. The aircraft of claim 19, wherein jet noise suppressor further comprises a divider positioned between the first nozzle and the second nozzle.

* * * * *